Sept. 20, 1966 J. M. BALDERSTON ET AL 3,274,340

DIGITAL DATA MULTIPLEXING AND DEMULTIPLEXING

Filed June 20, 1962 8 Sheets-Sheet 1

Sept. 20, 1966 J. M. BALDERSTON ET AL 3,274,340

DIGITAL DATA MULTIPLEXING AND DEMULTIPLEXING

Filed June 20, 1962 8 Sheets-Sheet 3

DIGITAL DATA MULTIPLEXING AND DEMULTIPLEXING

Filed June 20, 1962 8 Sheets-Sheet 4

Sept. 20, 1966 J. M. BALDERSTON ET AL 3,274,340

DIGITAL DATA MULTIPLEXING AND DEMULTIPLEXING

Filed June 20, 1962 8 Sheets-Sheet 6

3,274,340
DIGITAL DATA MULTIPLEXING AND DEMULTIPLEXING

John Michael Balderston and William G. Burke, Jr., Bowie, Md., assignors to ACF Industries, Incorporated, New York, N.Y., a corporation of New Jersey Filed June 20, 1962, Ser. No. 203,998
15 Claims. (Cl. 179—15)

This invention relates to a digital data transmission system and particularly to apparatus for multiplexing a plurality of parallel streams of binary data into a single serial stream for transmission to a receiver, and demultiplexing apparatus at the receiver for sorting the incoming data into a plurality of parallel channels.

The invention concerns high speed data transmission systems adapted to receive binary data from various sources such as a teletypewriter, an IBM data transceiver and a facsimile transmitter, and to serialize the data into a single synchronized stream for multiplex transmission, depending on the transmission speed of the system. The number of parallel-connected data sources may be quite large, for example sixteen. At the receiver the data is demultiplexed, so that the signal from each source is isolated, serialized and expanded in time to its original rate.

It is a general object of the invention to provide improved digital data multiplexing and demultiplexing equipment which is accurate, reliable, and flexible as to the number and types of data sources which can be accommodated.

Another object of the invention is to arrange non-synchronized data bits from various sources serially in a single stream and in synchronism with clock pulses.

The invention will be understood, and other objects and advantages thereof will become apparent from the following description and the drawing in which.

A digital data communication system comprises a transmitter and a receiver connected by a transmission line or other link. It may include a plurality of data input sources, a multiplexer for serializing all the data and feeding the same to the transmitter and a demultiplexer connected to the output of the receiver for selectively feeding the data originating at each source to a corresponding digital apparatus. For efficient transmission the incoming data pulses, which are asynchronous, are synchronized with locally generated clock pulses.

Figure 1:
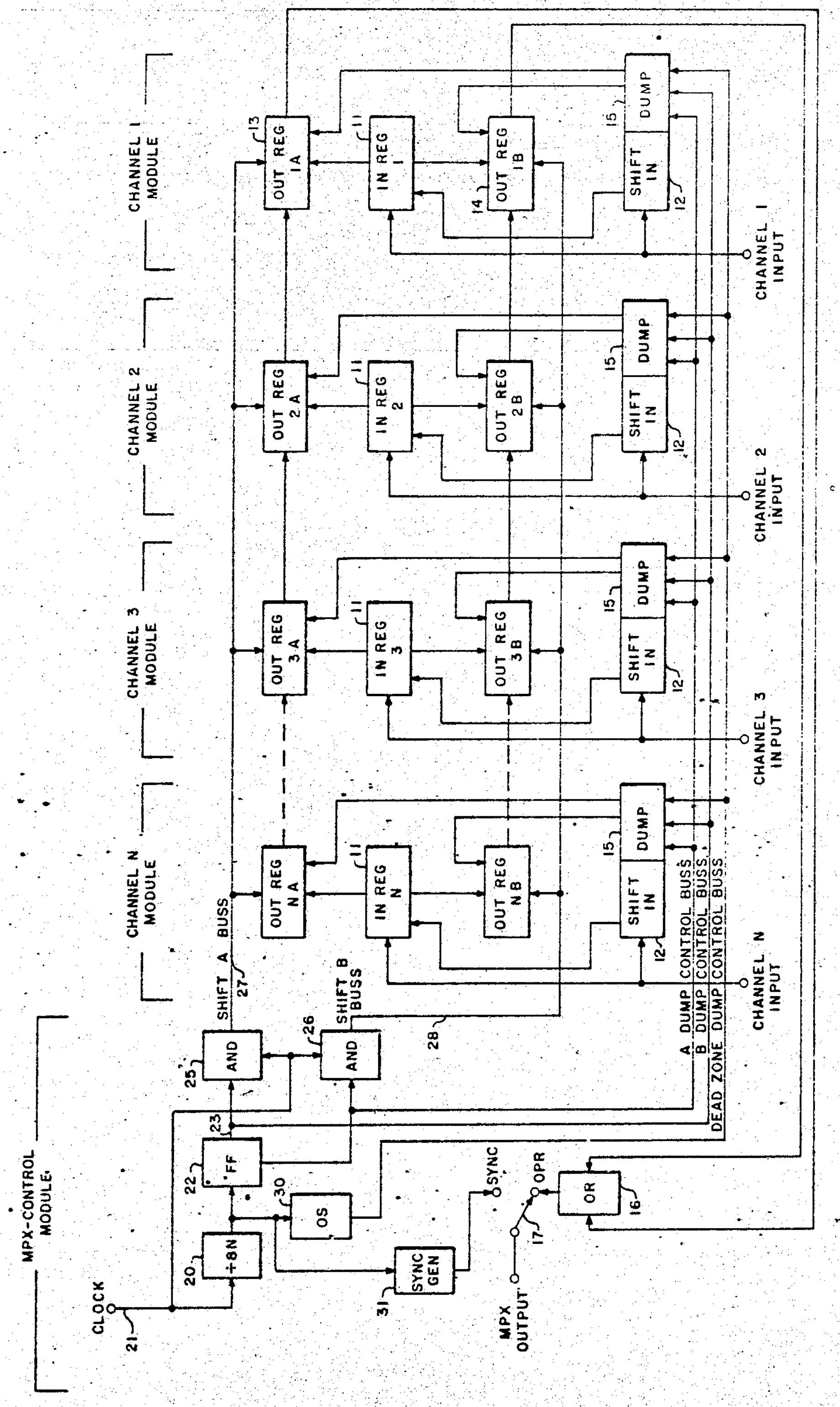
FIG. 1 is a block diagram of a multiplexer.

Referring to FIG. 1, a block diagram of a multiplexer according to the invention is illustrated. Digital signals arrive on channels I to N. Each channel input is connected to an input register 11 and a register shifting circuit 12 which controls its shift register 11. The latter is connected to output shift registers 13 and 14, which are called the "A" and "B" registers. The output registers of all channels are connected in series. It is assumed that each signal character may have eight digits, and in this case each register 11, 12 and 13 has eight stages, and thus the output registers are 8 N stages long. When a character has been read into one of the input registers 11, dump or trigger circuitry 15 transfers the entire character to one of the two output registers. At an appropriate time after the transfer from the input register 11 to either output register 13 or 14, the information in these registers is shifted out to OR circuit 16, the output of which is connected through switch 17 to a suitable transmitter (not shown) which may be of the type disclosed in application Serial No. 174,910, filed February 21, 1962, now Patent No. 3,204,029.

The control circuit, which is described and illustrated in greater detail hereinafter, comprises a frequency divider 20 which is supplied with constant frequency clock pulses supplied over line 21. The frequency divider divides by 8 N. The output of divider 20 is fed to flip flop circuit 22, which provides an output pulse of given polarity over line 23 and then over line 24 having a duration equal to 8 N clock pulses. The pulses on lines 23 and 24 control dump circuits 15, and also open gates 25 and 26 alternately, so that 8 N clock pulses are passed alternately by AND gates 25 and 26 over lines 27 and 28 for controlling the shifting of output registers 13 and 14. The output of frequency divider 20 is fed also to one-shot multivibrator 30, which in turn supplies signals to dump control circuits 15 to control the length of a dead zone of about 50 microseconds during which dumping into the output registers 13 and 14 is inhibited, for the purpose of preventing the initiation of dumping into one output register before dumping into the other output register has been completely terminated. The output of frequency divider 20 is also supplied to a synchronizing pulse generator 31 connected to switch 17 for sending synchronizing pulses to the receiver.

The apparatuses for handling the signals of various channels differ only slightly. As an example, the apparatus for one channel, particularly a Teletype channel, is shown in greater detail in FIG. 2. Herein the sections of input register 11 and output registers 13 and 14 for one channel each includes eight shift register stages. The output register stages are connected serially with the sections of the shift registers of the preceding and following channels by switches 40–43. If the channel is not in use, switches 40–43 are thrown to their upper idle position to replace the stages of registers 13 and 14 by through conductors 44–47. The Teletype signals are fed over line 50 to input circuit 51, which is a multistage amplifier and inverter supplying pulses of normal polarity to gate 52 and pulses of inverted polarity to gate 53. A Teletype character consists of a START bit, five data bits, and a STOP bit. Thus only five stages are required in the output registers 13 and 14 after the START and STOP bits are removed. The last three stages of input register 11 are, therefore, not connected to the other stages and are always set to 1 by gate 56. In addition, an extra shift register stage 57 is added at the front of the input register. Shift pulses are supplied over conductor 58 to gates 52 and 53 and input register 11. If register stage 57 were not added, six shift-in pulses would be used, and the STOP bit would not be inserted, whereas the START bit would be shifted out of the register. The dump signal could then occur during the period of the STOP bit, however, it is preferable to store the STOP bit in stage 57 and to dump after seven shift pulses. The reason for this is that the input signal from the Teletype may have noise in the STOP bit interval which would cause a dump signal to be produced. It is desirable therefore to use seven shift pulses and generate the dump signal after the end of the STOP bit.

Shift pulses are supplied to registers 13 and 14 over conductors 61 and 62 via emitter followers 63 and 64. The dump control circuitry comprises a quick recovery one-shot multivibrator 65 connected to input circuit 51. Multivibrator 65 gates seven cycles of astable multivibrator 66, which after amplification by emitter follower 67 are supplied via conductor 58 as the shift-in pulses. Adjustable timing capacitors 68 and timing registors 69 set the proper frequency of multivibrators 65 and 66. The end of the output pulse of multivibrator 65 triggers flip flop circuit 70 to set its output terminal to the "0" condition. If dead zone dump control buss 71 is also "0," AND gate 72 is enabled and one-shot multivibrator 73 is triggered and supplies a pulse to AND gates 75 and 76 through inverter 74. Thus a dump control pulse is gated to output registers 13 or 14 by gates 75 and 76 over conductors 77 and 78 depending on the voltage levels of the A and B dump control busses 80 and 81. This action transfers binary 1's from input register 11 to the appropriate output register 13, 14 via conductor 82 and 83. Simultaneously circuit 73 sends a pulse to flip flop circuit 70 to reset it to "1" in preparation for the next dump command signal. If the output of flip flop circuit 70 changes to "0" while the dead zone buss 71 is "1," multivibrator 73 still will not be triggered until dead zone buss 71 returns to 0. If the output of flip flop circuit 70 were to change to the 0 condition prematurely, a dump signal would be sent to both output registers 13, 14 and a spurious output would result. Upon completion of the dump or transfer to an output register, data is shifted out of that register by shift-out signals on buss 61 or 62.

Figure 3:
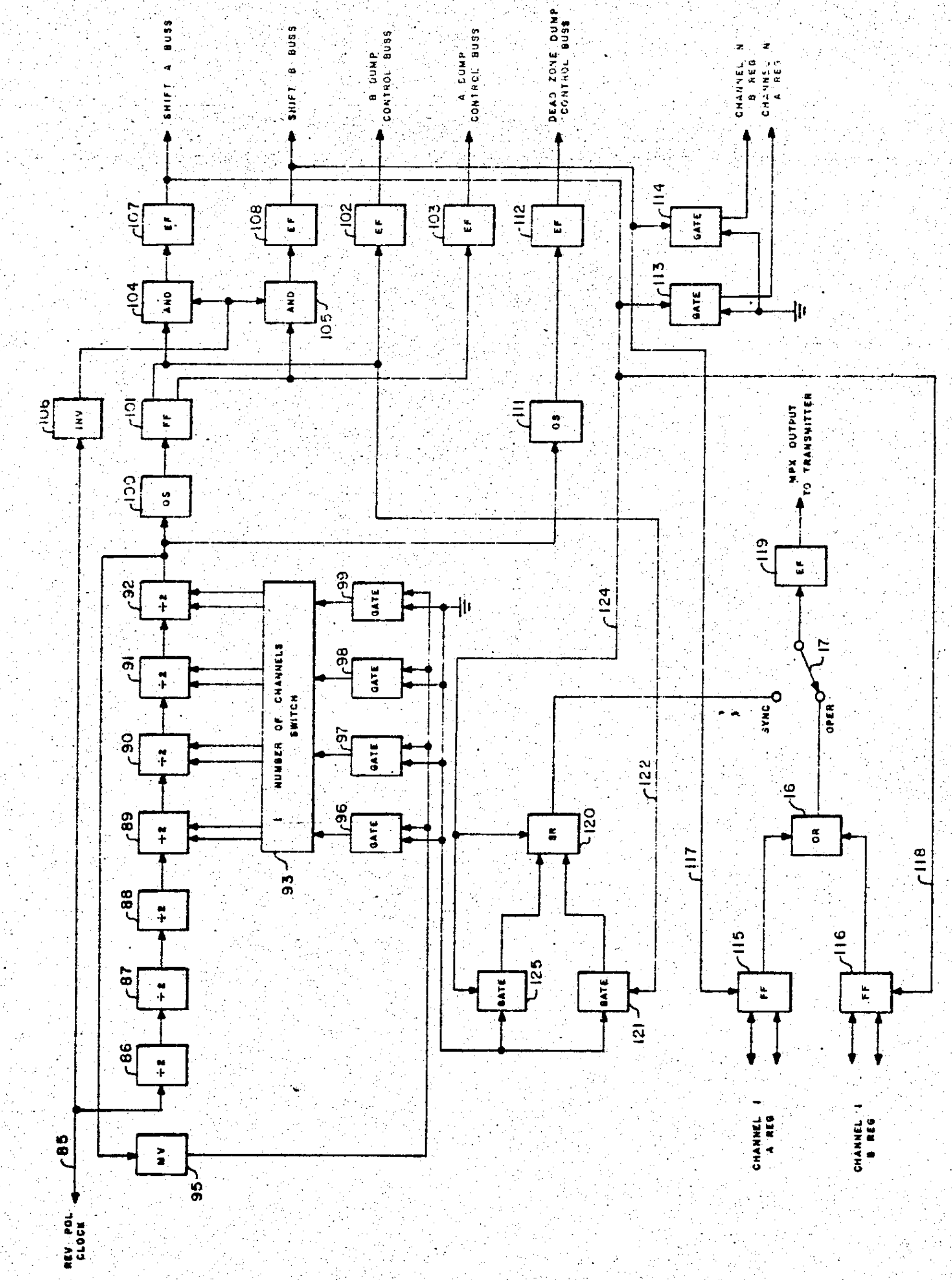
FIG. 3 is a diagram of the control circuitry of the multiplexer.

The control circuitry produces the dump control signals, provides signals for shifting output registers 13 and 14 and clearing the circuits, combines the output registers into a single data stream and provides synchronizing signals for use in demultiplexing. Referring to FIG. 3, clock signals of reversed polarity are received over conductor 85 and impressed on a chain of seven flip flop divider circuits 86–92. The first three divider circuits 86–88 divide the clock frequency by 8. Since the number N of data channels is variable the remaining divider stages 89–92 are controlled by a number of channels switch 93 to form a preset counter capable of counting to provide for a maximum of 16 channels. The 0 to 1 transitions at the output of flip flop circuit 92 occur every 8 N clock cycles and trigger one-shot multivibrator 95, which is connected to gates 96–99 for presetting flip flop stages 89–92 through these gates and switch 93. The pulse transitions from stage 92 are delayed 25 microseconds by one-shot multivibrator 100. This circuit triggers flip flop circuit 101 to produce two square wave outputs having a frequency of $1/16$ N times the clock frequency, and serving as the dump control signals after passing through emitter followers 102 and 103. The square wave dump control signals are also applied to AND gates 104 and 105 to gate the clock signals received from inverter 106. The gated clock signals are impressed on emitter followers 107 and 108 to provide the shift signals for output registers 13 and 14.

The output pulse from circuit 92 is also fed to one-shot multivibrator 111 which produces an inhibit pulse having a 50 microsecond duration at the output of emitter follower 112. Since multivibrator 100 introduces a 25 microsecond delay, the inhibit signal straddles the A and B dump control signals and prevents the occurrence of simultaneous dumping to both output registers, by providing a dump control dead zone.

Only 1's are transferred from the input registers 11 to output registers 13 and 14 and therefore the output registers must be cleared to put all stage at 0 after completion of each shift-out sequence. This operation is performed by gates 113 and 114, which are connected to the input of channel N output registers 13 and 14. Gates 113 and 114 are pulsed with the shift A and shift B signals produced by emitter followers 107 and 108. This causes 0's to be injected into the output registers and then shifted down the registers so that the registers are automatically cleared at the end of a shift cycle.

The ouputs of channel 1 output registers 13 and 14 are combined by flip flop circuits 115 and 116 and/OR gate 16. Additional stages 115 and 116 will not be cleared by the input of their respective registers; hence the first pulse from the opposite shift signal supplied by leads 117 and 118 sets each extra stage to 0. The output of OR gate 16 is the multiplexed signal and is applied through the operate position of switch 17 and emitter follower 119 to the transmitting apparatus (not shown).

A synchronizing signal is supplied by two-bit register 120. This signal is a single 0 at the beginning of alternate channel 1 segments of the multiplex cycle, followed by (16 N−1) 1's. The first stage of shift register 120 is set to 0 by the dump control transition impressed on gate 121 by conductor 122. This 0 signal in register 120 is shifted to the output of the register by the A shift pulse fed over conductor 124 to register 120, and also fed to gate 125 for setting the first stage of register 120 to 1. The output of this register then remains 1 until the first A register shift transition of a subsequent cycle. The output from register 120 or the multiplexed signals are then fed out by switch 17, depending on the position of the switch.

Figure 4:
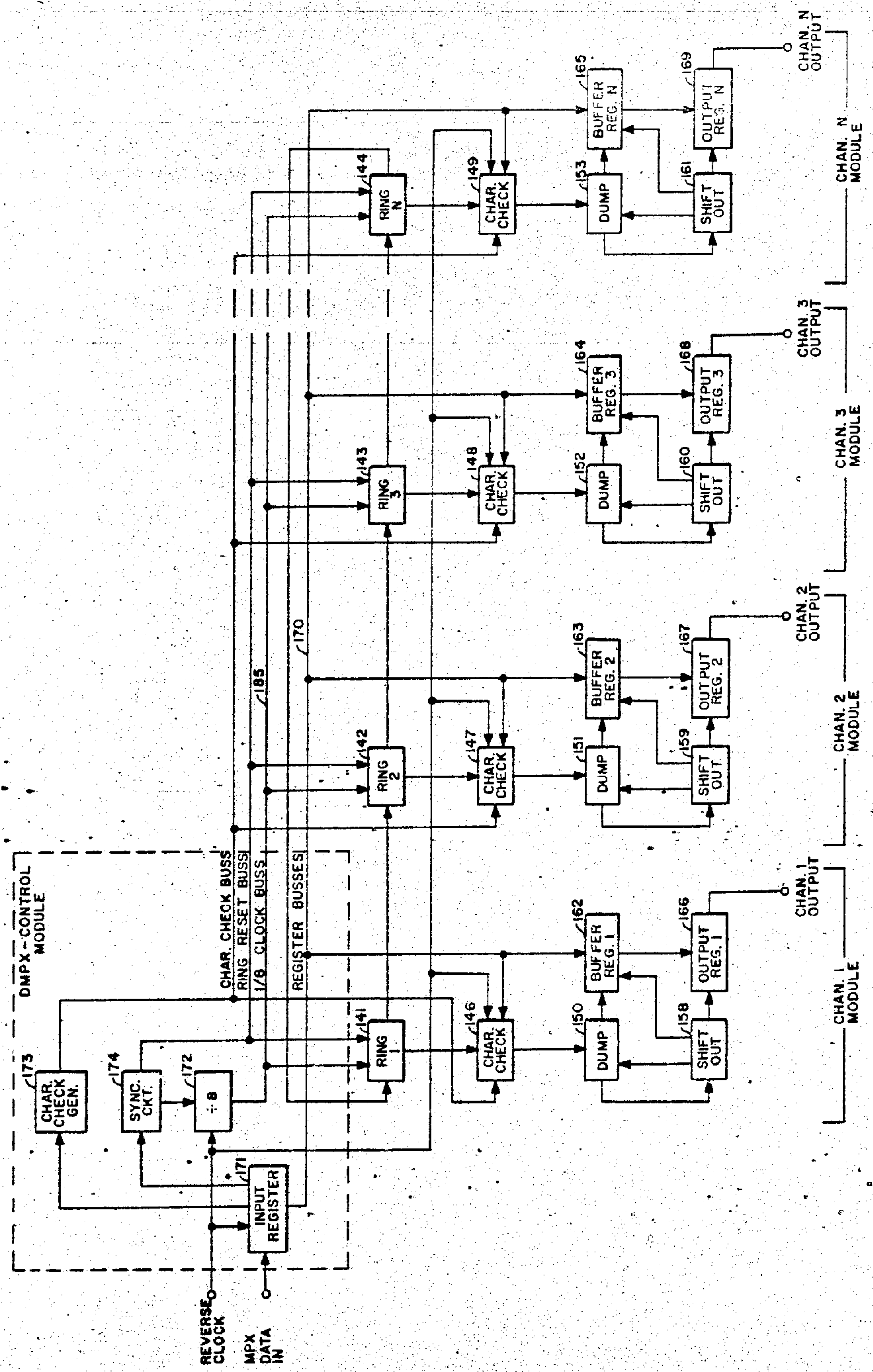
FIG. 4 is a block diagram of a demultiplexer.
Figure 5:
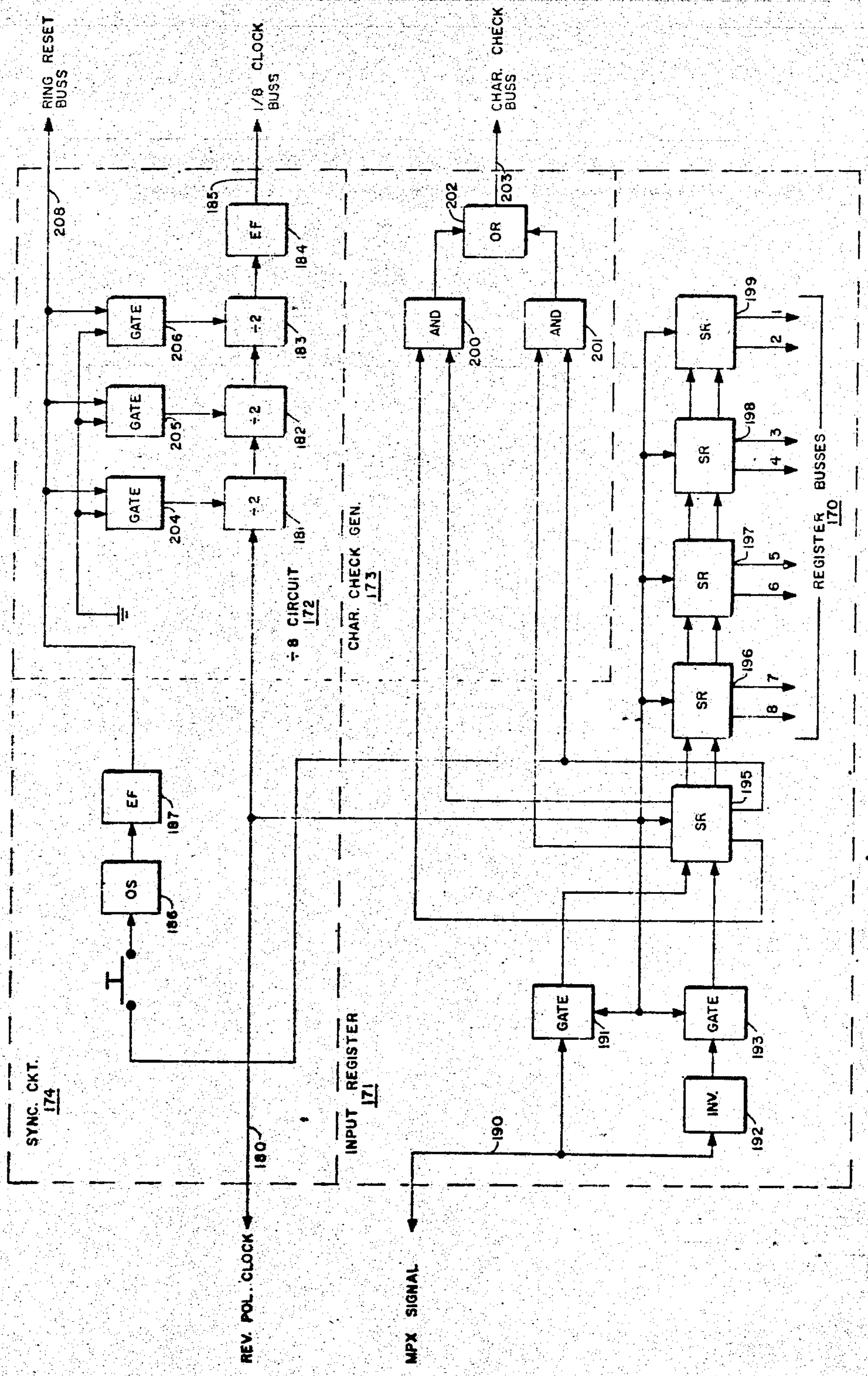
FIG. 5 is a diagram of a demultiplexer control circuit.

The demultiplexer at the receiving end is connected to the output of a suitable receiver designed to operate with a transmitter connected to the multiplexer, the transmitter and receiver being connected by a suitable transmission medium such as a wire line. The demultiplexer has the same number of channels of the same type as the multiplexer, such as Teletype, facsimile, etc. channels. The demultiplexer consists of a control unit and a channel module for each channel, as shown in FIG. 4. Each channel module may be considered as including the following six sections: a ring stage of a distributor 141–144, presence-of-character check circuitry 146–149, buffer register circuitry 150–152, buffer register clearing and shift out circuitry 158–161, a buffer register 162–165, and an output register 166–169. The control unit includes an input register 171, a frequency divider 172, a character check pulse generator 173, and synchronizer circuit 174. The demultiplexer control circuit performs the following functions:

(a) Synchronizes the demultiplex distributor;

(b) Provides the drive signal required to keep the distributor in synchronism;

(c) Converts the incoming serial data to parallel form;

(d) Indicates when data is being presented to the channel units.

The distributor in the demultiplexer is a ring counter with one ring stage 141–144 for each multiplex-demultiplex channel. Each channel provides for eight bits so that the ring is advanced once every eight clock cycles. The drive signal is obtained from the clock input 180 through the three-stage divider consisting of dividers 181–183 and output buffer 184. Assuming that the ring drive on 185 is initially in synchronism with the incoming data, it will remain in synchronism as long as the clock signal is present.

The synchronizing signal from the multiplexer is a single 0 bit followed by (16 N−1) 1 bits, where N is the number of channels present. The 0 is transmitted at the start of alternate channel 1 segments of the multiplex cycle. The selection of this particular synchronizing signal is arbitrary, since any signal that provides a fixed reference point in the multiplex cycle may be used. The timing circuitry for this signal is explained more fully below. Briefly, however, the 0 synchronizing signal triggers one shot 186 which, and through buffer 187, presets divider 181–183 and distributor 141–144 to the correct state.

The incoming serial data is fed to 10 bit shift register 171, consisting of shift register 195–199 over conductor 190. Thus at any time, as many as 10 consecutive bits may be obtained in parallel by noting the state of each stage of the shift register. Since each channel segment is 8 bits long, only the last eight stages (register busses 1 through 8) are used, with the first two stages used to derive the synchronizing and character check control signals. The incoming bits are nominally in phase with the normal phase of the clock signal, so that the reverse phase is used to sample the bits at mid-baud to eliminate jitter and distortion. The incoming signal is fed directly to gate 191 and inverter 192 and applied to gate 193. The gates provide a mid-baud sampling. The inversion by inverter 192 is required because both polarities are needed at the input of the shift register.

In at least two classes of data, parity checks are used, so that in each character of 8 bits there is at least one transition from 0 to 1 or from 1 to 0. The two classes are IBM Data Transceiver code (4 out of 8) and Fieldata code (odd parity). Thus, somewhere in such a character, two adjacent bits will be different. The character check unit 173, consisting off AND gates 200 and 201 and OR gate 202 puts out a 0 whenever this occurs. Disregarding the inversions (which cancel out) and calling the first of any two bits A and the second B, the character check signal on buss 203 will be 0 if A is 1 and B is 0 or if A is 0 and B is 1. These signals generated by AND gates 200 and 201 and OR gate 202 continuously monitor the first two stages of the shift register 171.

The transitions of the distributor are used as sampling indicators; that is, at the time the ring stage 141–144 for a generation of the ring reset pulse. The action of the ring counter is such that the last channel (channel N) is sampled before channel 1. Thus, the proper initial stage mentioned above occurs when the channel N ring stage 144 is set to 1 and all others are set to 0. It is for this reason that channel N may not be bypassed ("IDLE") as may all other channels.

When initial synchronization is established in this manner, synchronization is maintained only by aligning the clock with the incoming data. As long as this condition is fulfilled, the ⅛ CLOCK BUSS will have a positive transition, at the beginning of the first bit of each character as it appears on register buss 1. The ring stage in a particular channel will have a 0 to 1 transition at the time that the 8 bits for that channel first appear on the 8 register busses.

Figure 6:
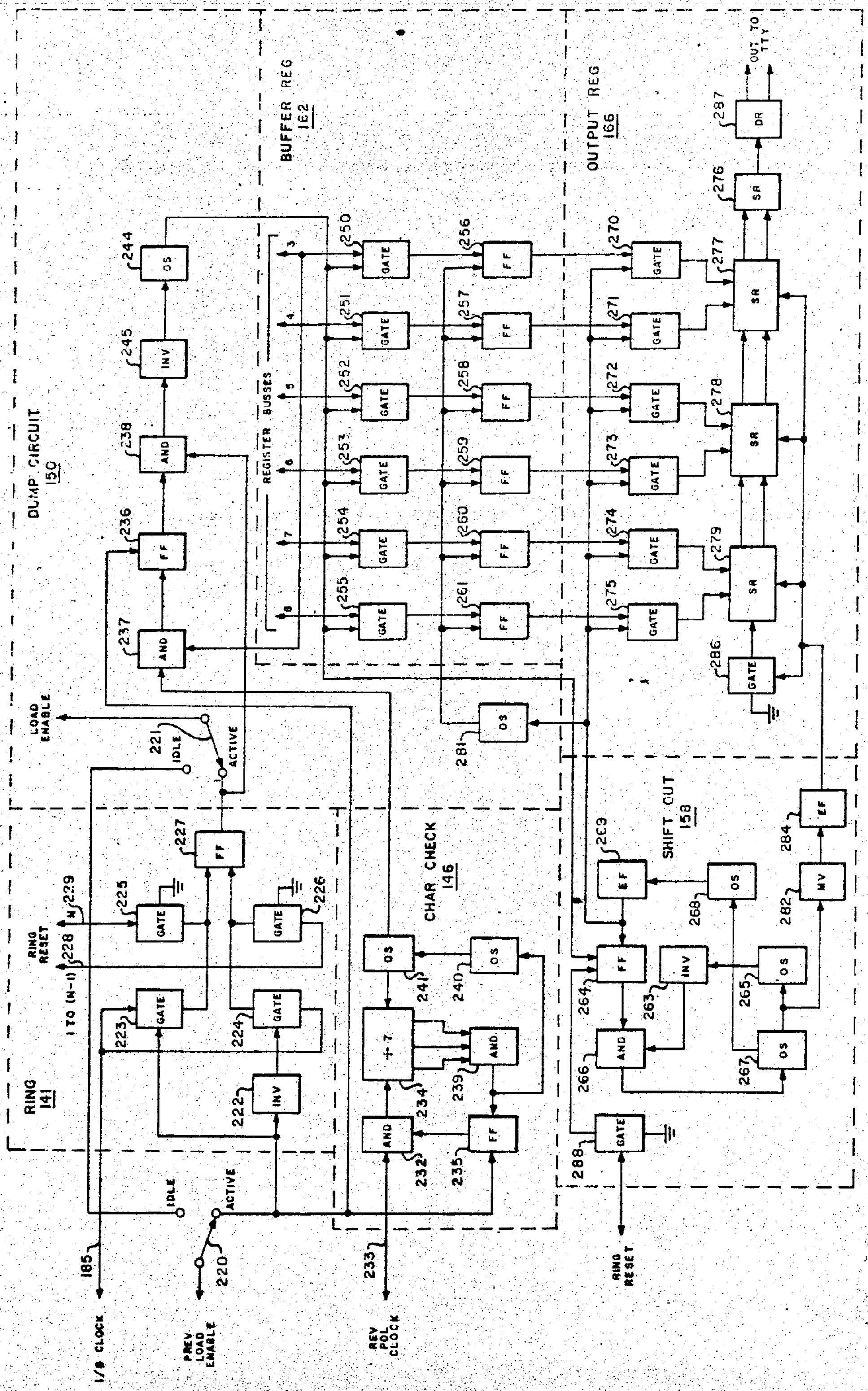
FIG. 6 is a diagram of a demultiplexer channel corresponding to the multiplexer channel of FIG. 2.

As noted above the various demultiplex channels are adapted to handle different types of signals, but all are generally similar and have certain features in common. The teletype channel module shown in FIG. 6 will now be described as an example.

Switches 220 and 221 are placed in active position if the channel is in use, and in idle position if the channel is not in use. If the channel is the Nth or last channel, it must be kept active or operative. The ring stage consists of inverter 222, gates 223–226 and flip flop circuit 227 connected as shown. The input from the particular channel changes from 0 to 1, the 8 register busses 170 are sampled to determine the bits in the particular cycle. To insure proper operation, the distributor must advance in response to a drive signal on buss 185 at the time that the correct 8 bits appear on the register busses.

Figure 7:
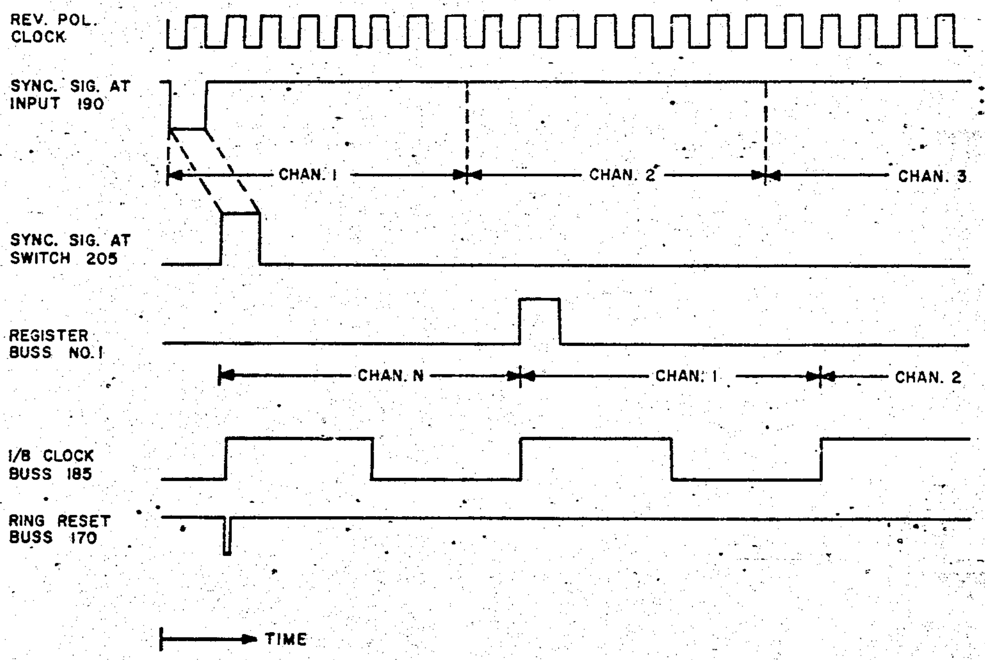

The synchronizing signal is shown in FIG. 7. The 0 is the first bit of the channel 1 character and the bits on the register busses are inverted from the bits on the line going into the demultiplexer. One and a half clock cycles after the synchronizing bit appears at the input, it appears in inverted form at switch 205. When SYNC switch 205 is closed, the leading edge of the synchronizing bit at this point triggers one-shot circuit 186 which, through buffer 187 and gates 204–206, sets all outputs of counter 181–183 at 0 and, through gates (210, 211 of FIG. 6) in the channel units, sets the distributor 141–144 to the proper initial state. The distributor drive signal on ⅛ CLOCK BUSS 185 then appears as in FIG. 7.

The data moves in the shift register 171 toward stage 199, that is, when the first bit of a character is on register buss 5, for example, the second bit will be on register buss 6, the third on 7, and so on. Therefore, the proper sampling time for a particular channel occurs when the first bit appears on register buss 1. FIG. 7 shows that the synchronizing bit does not appear on register buss 1 for 8 clock cycles, or one cycle of the ⅛ CLOCK BUSS, after previous ring stage is impressed on inverter 222 through switch 220 and the output of flip flop circuit 227 is fed to the next ring stage through switch 221. The distributor formed by the ring stages may be considered a shift register having its last stage connected to the first. The shifting is controlled by the ⅛ clock signal on buss 185 connected to gates 223 and 224. If the module is not the last channel the ring reset signal from synchronizing circuit 174 is supplied over conductors 208 and 228 to gate 226, and if the modle is in the last channel the reset signal is supplied by conductor 229 to gate 225. Thus, if the module is that of the last channel gate 225 is used and will set flip flop circuit 227 initially to 1. If the module is not that of the last channel the ring stage will be set initially to zero and gate 226 is used.

The Teletype (or Baudot) code has no parity checking, so that the character check signal generated in the demultiplexer control unit cannot be used. Within the multiplex system, a teletype character consists of three fixed bits at the beginning followed by five data bits. Thus, in detecting the presence of a character in the teletype demultiplexer (DMPX–TTY), it is valid to look for at least one of these bits. There are three bits, and each bit is on the register busses for eight clock cycles; hence, there is a large choice of sampling times and positions. There are five data bits, and one of the fixed bits can be used to generate the START bit in the output signal. Thus, for convenience, only six of the register busses are used.

The character check circuit comprises AND gate 232, which receives a reversed polarity clock signal over conductor 233, counter 234 connected to gate 232, flip flop circuits 235 and 236 which receive signals from the previous ring stage via switch 220, and gates 237, 238 and 239, and one-shot multivibrators 240 and 241 which feed the counter 234 and gate 237. These circuits, connected as shown, have the following sequence of operations.

The load enable transition appearing at switch 220 from the previous channel sets flip flop 235 to 1 and flip flop 236 to 0. AND gate 232 then allows clock pulses to enter counter 234. Due to the inversion in gate 232, the input to counter 234 is delayed ½ cycle. After 6 inverted input pulses (6½ clock cycles), the outputs of counter 234 are all 0, which then resets flip flop 235 through AND gate 239. This inhibits additional inputs to counter 234 and triggers one-shot circuit 240. After 25 microseconds (not more than ⅛ clock cycle), one-shot circuit 241 is triggered, resetting counter 234 and sampling register buss 3 through AND gate 237 for the fixed bit. If the bit is present (register buss 3 in 1 state), flip flop 236 is set to 1, and when the load enable signal comes to 1, one-shot circuit 244 is triggered through inverter 245.

One-shot circuit 244 is the dump circuit. When it is triggered, 1's on register busses 3 through 8 are entered through gates 250–255 into the buffer register, composed of flip flops 256–261. One-shot circuit 244 also sets flip flop 264 to 0. This is the start of the shift out and clear cycle.

Figure 8:
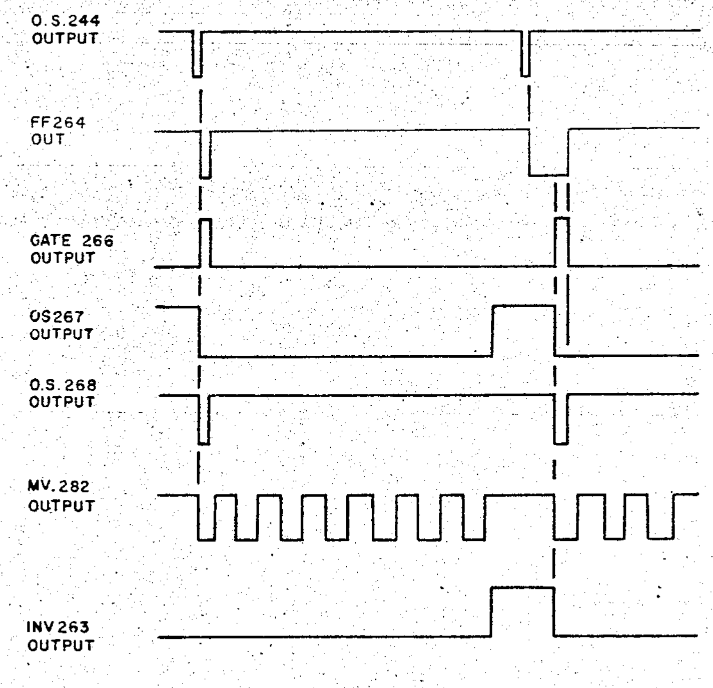
FIGS. 7 and 8 are charts of signals appearing at various points in the demultiplexer.

It is assumed that immediately before receipt of the trigger from circuit 244, flip flop 264 is at 1 and one-shot circuit 265 is at 0. Thus, when flip flop 264 goes to *O*, the output of AND gate 266, connected to circuit 265 through inverter 263, will switch from 0 to 1, triggering one-shot circuit 267. The timing sequence is shown in FIG. 8. The start of the one-shot 267 output triggers one-shot circuit 268 which resets flip flop 264 to 1, through emitter follower 269. The output of emitter follower 269 is applied to gates 270–275 to transfer the data in the buffer register to the output register, which includes shift registers 276–279. At the same time, circuits 268 and 269 trigger one-shot circuit 281 which, after a 50 μsec. delay, clears buffer register 250–261 by setting all outputs to 0. This is necessary since, as noted above, only 1's are entered into the buffer register. Multivibrator 282 is connected to one-shot circuit 267 so as to be uninhibited and run free when receiving a 0 from circuit 267. Its output rate is adjusted to 45.5, 57 or 74 c.p.s. to correspond to the speed of the particular Teletype terminal machine, which speed may be 60, 75 or 100 words per minute, respectively. The duration of the 0 output from circuit 267 is set to allow 7 cycles from multivibrator 282. Zeroes are shifted through emitter follower 284 and gate 286 into the output register. This action supplies the proper STOP bit level as well as clearing the output register, since only 1's are transferred into the output register 276–279. The Teletype driver 287 converts the signals to a 60 ma. current drive for the Teletype receiver.

As indicated in the timing diagram of FIG. 8, the end of the output from circuit 267 triggers one-shot circuit 265. The duration of the output pulse of circuit 265 is set to about 0.9 times the nominal Teletype bit duration, which, added to the 0.5 bit duration introduced by circuit 282 corresponds to the minimum STOP bit length of about 1.42 data bits. The output of circuit 265 is used to inhibit AND gate 266, insuring that this minimum time will elapse before the output cycle can begin again, and that the output will have the correct logical form. Its presence is a result of the asynchronous-synchronous-asynchronous timing as the Teletype data goes through the multiplex-demultiplex system. This is indicated in the second cycle of FIG. 8. The dump signal to buffer register pulse from circuit 244 arrives while the output of circuit 265 is 1, that is, before the output STOP bit is finished. Since gate 266 is now inhibited, there will be no output from it until the end of the 1 from circuit 265. When this circuit changes from 1 to 0, gate 266 will switch from 0 to 1 and one-shot circuits 267 and 268 will be triggered as before.

When power is first turned on, flip flop 264 could conceivably start with its output at 0, so that the shift out circuit could never be triggered. However, when the system is synchronized, the ring reset signal through gate 288 sets the output of flip flop circuit 264 to 1.

A typical sequence of operations is as follows. The ring stage in channel X changes from 0 to 1. At this time, the character check circuitry indicates that data is present on the register busses. It should be pointed out that this check for the presence of data is performed just before the ring transition in some types of channel modules, and immediately after in others. In either case, the dump circuitry is energized and the data is transferred to the buffer register. At the same time, the shift out circuitry is informed of this action, and if the output register is clear, the data is again transferred to the output register. If the output register has not been cleared, the data is held in the buffer register until it can be transferred. Immediately after the transfer to output register, the buffer register is cleared and the final data transfer to the terminal equipment starts.

Figure 9:
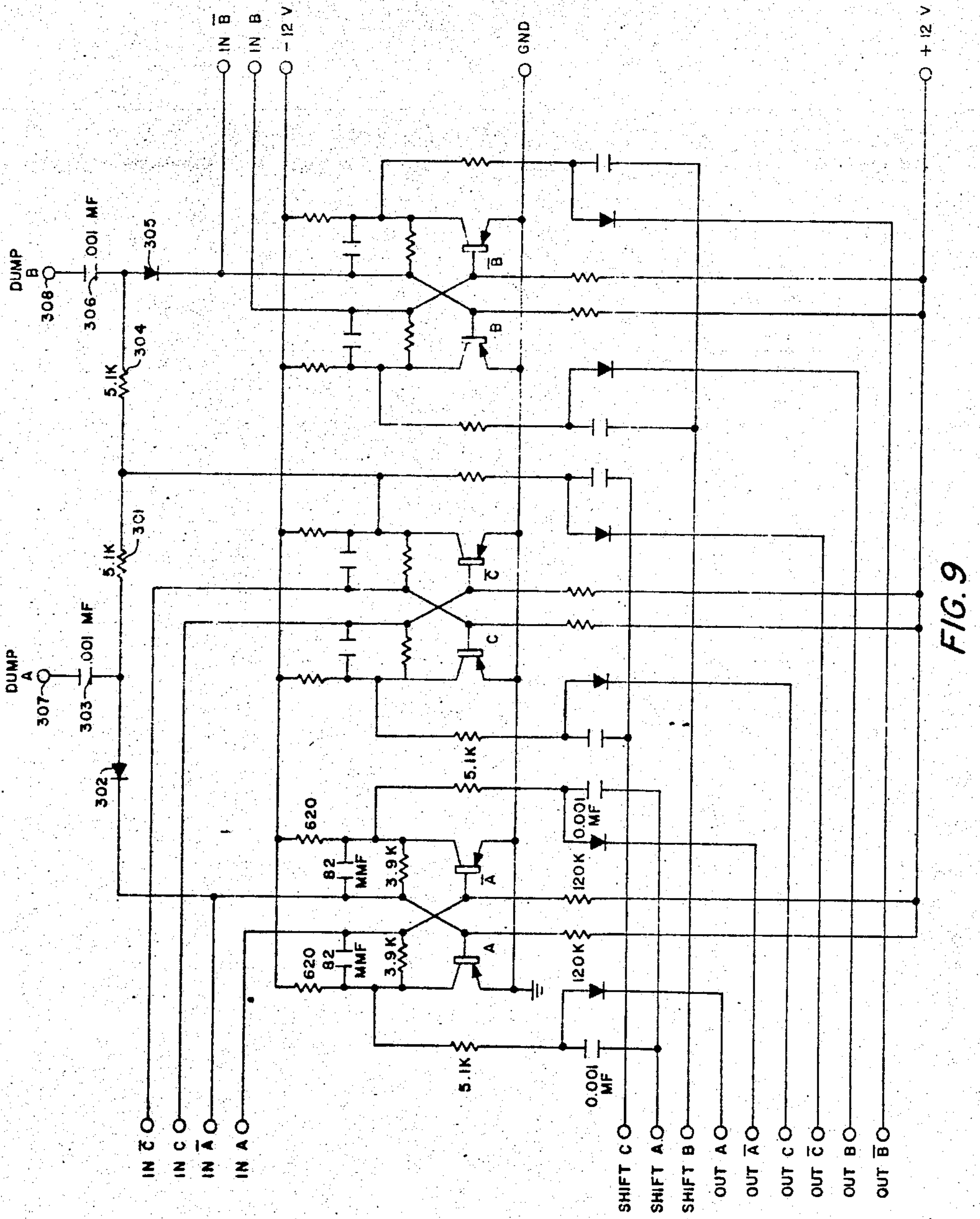
FIG. 9 is a circuit diagram of one stage of the multiplexer input and output shift registers.

In the multiplex shift register each stage of the input register 11 is connected by gating circuits to the corresponding stages of the two output registers 13 and 14. The stages of the three registers are identical flip flop circuits, as shown in FIG. 9, and therefore the values of the components of only stage A, $\overline{A}$ are given. The stage having transistors C and $\overline{C}$ is an input shift register stage and the A, $\overline{A}$ and B, $\overline{B}$ stages are output shift register stages. The normal and inverted input, output and shift connections of these stages are indicated in FIG. 9; the inverted values being indicated by a line over the letter designating the stage. Elements 301–303 constitute a diode gate for shifting from input stage C, $\overline{C}$ to the A, $\overline{A}$ output stage in response to a dump signal on terminal 307. Similarly a dump signal on terminal 308 causes a transfer of the output of stage C, $\overline{C}$ to output stage B, $\overline{B}$ through gate 304–306.

Other circuits used in the present system are all of well known types, and their operation is well understood. The circuits actually used in the system herein disclosed are shown and described in a booklet entitled "Basic Components" published December 1961 by ACF Industries, Incorporated, Electronic Division, Riverdale, Maryland.

Figure 2:
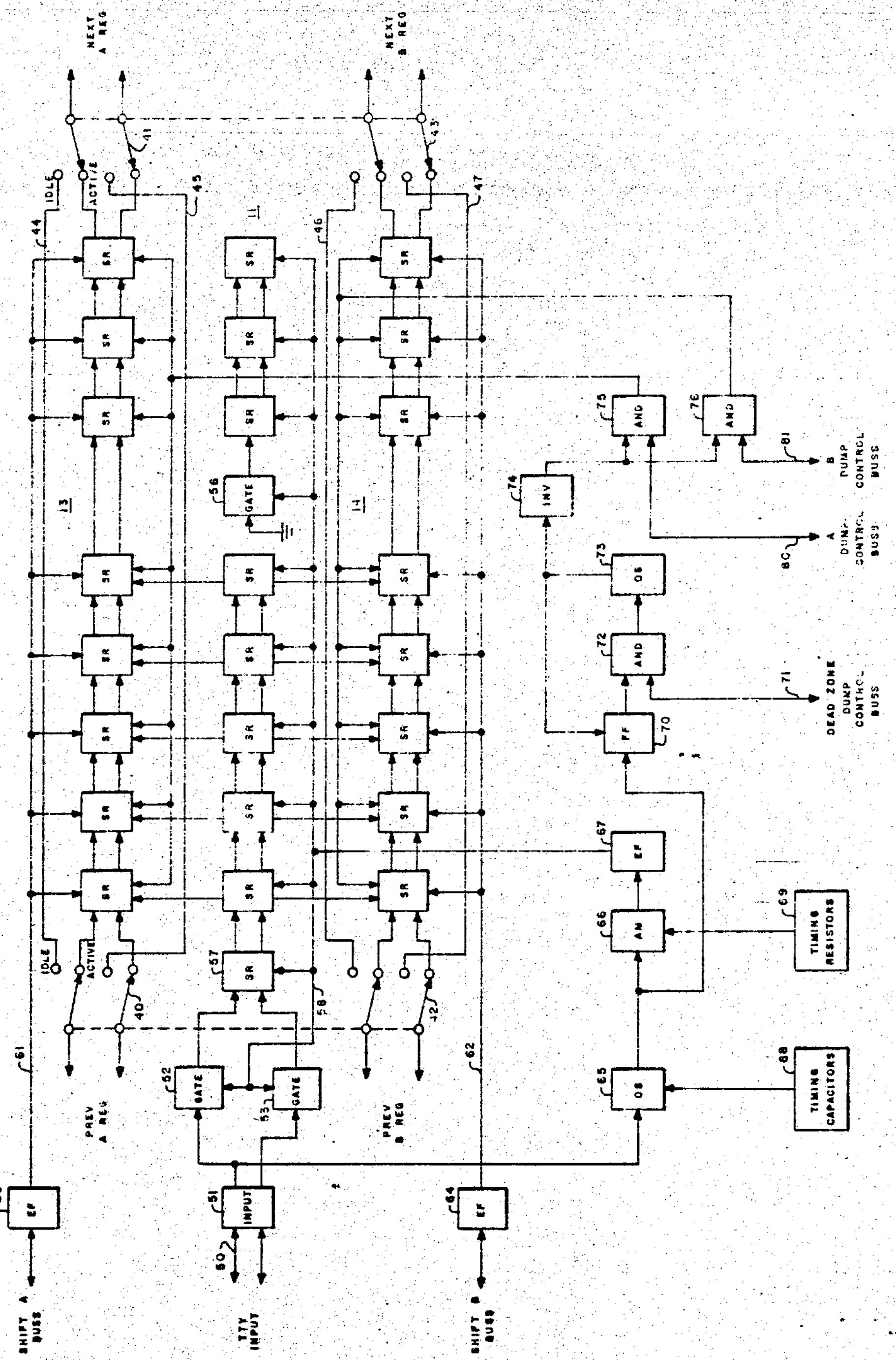
FIG. 2 is a diagram of one channel of the multiplexer.

As mentioned previously, various channels of the multiplexer and demultiplexer are adapted to handle various types of digital data, such as facsimile, IBM Signal Unit (Types 65–68) and serial synchronous data, although for the sake of simplicity only a teletype multiplexer and demultiplexer have been illustrated and described. The multiplexers and demultiplexer for these other types of data are very similar to those disclosed herein. The IBM data multiplexer for example is substantially the same as the teletype multiplexer except that gate 56, FIG. 2 is not used, and the last three stages at the right hand end of input register 11 are connected in series with the preceding five stages of that register. The same change of the input register is made in the facsimile and serial synchronous data channels. The demultiplexers for these channels and the IBM channel are similar in configuration and operation to the teletype demultiplexer. One difference is that instead of the six stages of the buffer register 250–255 and 256–261 of the Teletype demultiplexer, the others have eight buffer register stages and utilize all eight register busses, and the output register has an additional stage. Despite the differences between different channels their construction and operation will be understood from the exposition of the teletype channel.

It will be apparent that many modifications and variations of the invention are possible. The scope of the invention, therefore, is not to be construed as limited except as defined in the following claims.

What is claimed is:

1. A multiplexing system for digital data comprising, a multiplexer having a plurality of channels each having an input register capable of storing a predetermined number of pulses, different pulse data sources in said channels each connected to one of said registers, a plurality of first output shift registers each connected to one input register, a plurality of second output shift registers each connected to one input register, each output register having a number of stages connected in series and capable of storing the number of pulses stored by the input register to which it is connected, said input and output registers including gating means connecting the input register to each stage of the first and second output registers separately, all first output registers being connected in series, all second output registers being connected in series, an output circuit connected to the outputs of the first and second registers in parallel, dump control means for simultaneously transferring the pulses stored in the input registers through said gating means to the first output registers, means for serially shifting the pulses in said first output registers therethrough at a constant rate to the output circuit, dump control means for thereafter simultaneously transferring the pulses stored at a predetermined later time in the input register through said gating means to the second output registers, and means for serially shifting the pulses in said second output registers therethrough at a constant rate to said output circuit.

2. A system according to claim 1, wherein said output circuit includes an OR circuit having one input connected to the first output registers and another input connected to the second output registers.

3. A system according to claim 1, including means for clearing the output registers before input pulses are transferred thereto from the input registers.

4. A system according to claim 1, wherein the input registers are shift registers.

5. A system according to claim 4, including means for inhibiting for a predetermined time the transfer of stored pulses from the input registers to the output registers after each such transfer, for insuring against simultaneous transfer to both the first and second output registers.

6. A system according to claim 1, including means for generating synchronizing pulses at the end of a shift-out from the first output registers, said output circuit including switching means for selecting the synchronizing pulses or the outputs of the output registers.

7. A system according to claim 1, including means for generating synchronizing pulses at the end of a shift-out from the first output register, and means for impressing said synchronizing pulses on said output circuit.

8. A system according to claim 7, including a demultiplexer connected to said output circuit, said demultiplexer including an input shift register connected to receive and store the multiplexed data pulses, a buffer for each channel, a distributor for producing sequential dump control signals, dump control means for simultaneously transferring the data stored in the input shift register to the buffer registers of successive channels in response to the dump control signals, a separate output circuit for each buffer register including means for shifting out the data stored in the buffer register serially.

9. A system according to claim 8, wherein said last mentioned output circuits each includes a shift register and means for simultaneously transferring the data stored in a buffer register to the shift register.

10. A system according to claim 9, comprising character check signal generating means for producing an output signal in response to the data in each channel, and means responsive to character check signals for selectively enabling the operation of the dump control means in each demultiplexer channel.

11. A system according to claim 8, comprising means for short circuiting a desired multiplexer channel and the corresponding demultiplexer channel and enabling the remaining active channels to operate in proper timed relationship.

12. A system according to claim 8, wherein said distributor includes a ring circuit having one stage thereof in each channel with the output of the last stage connected to the input of the first stage, a source of clock pulses and a divider circuit connected between said source and said ring circuit.

13. A system according to claim 12, comprising means responsive to a synchronizing pulse for synchronizing the divider circuit and the distributor.

14. A system for demultiplexing serialized digital data bits in the form of a sequence of different types of characters each having a fixed number of bauds allocated thereto, comprising means for receiving the data bits and synchronizing signals and clock pulses, an input shift register, means connecting the shift register and the receiving means for shifting the data bits through the register in response to the clock pulses, said register having at least one stage for each data bit of a character, a separate multiple stage buffer register for each character of said sequence, dump control means for transferring simultaneously all data bits of a character from the input register to a selected buffer register, a separate multiple stage output shift register for each type of character, means for simultaneously transferring the data bits of a character from a buffer register to an output register, and means for shifting out the stored data in each output register.

15. A multiplexing system for digital data comprising a multiplexer having a plurality of channels each having an input register having a number of stages capable of storing a predetermined number of pulses, different pulse data sources in said channels each connected to one of said registers, a plurality of first output shift registers each connected to one input register, a plurality of second output shift registers each connected to one input register, each output register having a number of stages connected in series and capable of storing the number of pulses stored by the input register to which it is connected, means connecting each stage of the input registers to one stage of the first output registers and one stage of the second output registers separately, all first output registers being connected in series, all second output registers being connected in series, an output circuit connected to the outputs of the first and second registers in parallel, dump control means for simultaneously transferring the pulses stored in the input registers to the first output registers, means for serially shifting the pulses in said first output registers therethrough at a constant rate to the output circuit, dump control means for thereafter simultaneously transferring the pulses stored at a predetermined later time in the input register to the second output registers, and means for serially shifting the pulses in said second output registers therethrough at a constant rate to said output circuit.

References Cited by the Examiner

UNITED STATES PATENTS

| | | | |
|---|---|---|---|
| 3,020,350 | 2/1962 | Black et al. | 179—15 |
| 3,029,311 | 4/1962 | Ward | 179—15 |
| 3,049,593 | 4/1962 | Touraton et al. | 179—15 |

DAVID G. REDINBAUGH, *Primary Examiner.*

T. G. KEOUGH, R. L. GRIFFIN, *Assistant Examiners.*